(12) United States Patent
DeWeese et al.

(10) Patent No.: US 10,120,988 B2
(45) Date of Patent: Nov. 6, 2018

(54) MANAGING GROUPED STUDENT DEVICES WITH TIMED LOCKS

(71) Applicant: AirWatch, LLC, Atlanta, GA (US)

(72) Inventors: Bill DeWeese, Haltom City, TX (US); Kevin McKeithan, Fort Worth, TX (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

(21) Appl. No.: 15/252,605

(22) Filed: Aug. 31, 2016

(65) Prior Publication Data

US 2016/0379508 A1  Dec. 29, 2016

Related U.S. Application Data

(63) Continuation of application No. 14/753,813, filed on Jun. 29, 2015.

(51) Int. Cl.
| | |
|---|---|
| *H04L 29/06* | (2006.01) |
| *G06F 21/30* | (2013.01) |
| *G09B 5/10* | (2006.01) |
| *G09B 5/12* | (2006.01) |
| *G09B 5/14* | (2006.01) |
| *H04L 29/08* | (2006.01) |

(Continued)

(52) U.S. Cl.
CPC ........ *G06F 21/305* (2013.01); *G06F 21/6218* (2013.01); *G09B 5/08* (2013.01); *G09B 5/10* (2013.01); *G09B 5/125* (2013.01); *G09B 5/14* (2013.01); *H04L 63/104* (2013.01); *H04L 67/10* (2013.01); *H04W 12/08* (2013.01); *G06F 3/0482* (2013.01); *G06F 2221/2137* (2013.01); *G06F 2221/2149* (2013.01)

(58) Field of Classification Search
CPC .. G06F 21/305; G06F 21/6218; G06F 3/0482; G06F 2221/2137; G06F 2221/2149; G09B 5/08; G09B 5/125; G09B 5/14; H04L 63/104; H04L 67/10; H04W 12/08
See application file for complete search history.

(56) References Cited

U.S. PATENT DOCUMENTS

| | | |
|---|---|---|
| 5,881,236 A | 3/1999 | Dickey |
| 6,411,796 B1 * | 6/2002 | Remschel ............... G09B 5/06 434/118 |

(Continued)

OTHER PUBLICATIONS

STIC Search Strategy (Requested Jan. 3, 2018).*

(Continued)

*Primary Examiner* — Sharon S Lynch
(74) *Attorney, Agent, or Firm* — Clayton, McKay & Bailey, PC

(57) ABSTRACT

Systems and methods presented herein can allow a teacher to manage student devices in a classroom setting by grouping student devices on a graphical user interface and using the interface to set locks with respect to the groups of student devices. Lock requests can be received and managed by a server, which can issue file locks, web locks, and application locks. These locks can restrict file access, website access, and application access, respectively, on the students' personal mobile devices. Additionally, the teacher device can allow the teacher to provide timing information in conjunction with the lock requests, which can control when to lock and/or unlock the student devices.

15 Claims, 12 Drawing Sheets

(51) Int. Cl.
*G09B 5/08* (2006.01)
*G06F 21/62* (2013.01)
*H04W 12/08* (2009.01)
*G06F 3/0482* (2013.01)

(56) References Cited

U.S. PATENT DOCUMENTS

| | | | | |
|---|---|---|---|---|
| 8,548,452 B2* | 10/2013 | Coskun | ............... | G06Q 10/10 455/419 |
| 8,745,213 B2* | 6/2014 | Dare | ............... | G06F 8/60 370/352 |
| 8,788,655 B2* | 7/2014 | Dare | ............... | G06F 8/61 370/352 |
| 2002/0085029 A1* | 7/2002 | Ghani | ............... | G06Q 10/10 715/751 |
| 2005/0130633 A1* | 6/2005 | Hill | ............... | H04M 1/665 455/414.1 |
| 2006/0064476 A1 | 3/2006 | Decasper | | |
| 2006/0147891 A1* | 7/2006 | Dreyfous | ............... | G09B 5/00 434/362 |
| 2007/0243862 A1* | 10/2007 | Coskun | ............... | G06Q 10/10 455/418 |
| 2012/0036552 A1* | 2/2012 | Dare | ............... | H04L 41/0253 726/1 |
| 2012/0101952 A1* | 4/2012 | Raleigh | ............... | G06Q 30/016 705/304 |
| 2012/0202185 A1* | 8/2012 | Jabara | ............... | G09B 5/00 434/350 |
| 2012/0231434 A1* | 9/2012 | Standage | ............... | G09B 5/06 434/350 |
| 2012/0272295 A1* | 10/2012 | Patton | ............... | H04B 10/1149 726/4 |
| 2013/0065555 A1* | 3/2013 | Baker | ............... | G06Q 20/105 455/410 |
| 2013/0305322 A1* | 11/2013 | Raleigh | ............... | G06Q 30/016 726/4 |
| 2013/0309648 A1* | 11/2013 | Park | ............... | G09B 5/00 434/350 |
| 2014/0026128 A1* | 1/2014 | Rocha De la hoz | .. | G06Q 10/06 717/168 |
| 2014/0038546 A1* | 2/2014 | Neal | ............... | G06Q 10/103 455/405 |
| 2014/0080471 A1* | 3/2014 | Coskun | ............... | G06Q 10/10 455/419 |
| 2014/0278895 A1* | 9/2014 | Grimes | ............... | G06Q 30/0231 705/14.31 |
| 2015/0007307 A1* | 1/2015 | Grimes | ............... | G09B 5/08 726/18 |
| 2015/0072641 A1* | 3/2015 | Raleigh | ............... | G06Q 30/016 455/406 |
| 2015/0222759 A1* | 8/2015 | Baker | ............... | G06Q 20/105 455/405 |
| 2015/0304330 A1* | 10/2015 | Soamboonsrup | ...... | G09B 5/08 726/4 |
| 2015/0304484 A1* | 10/2015 | Halmstad | ............... | H04M 1/72577 455/419 |
| 2015/0319293 A1* | 11/2015 | Cerda | ............... | H04W 48/04 455/418 |
| 2016/0027318 A1* | 1/2016 | Rao | ............... | G09B 5/06 434/309 |
| 2016/0335424 A1* | 11/2016 | Hampson | ............... | G06F 21/31 |
| 2016/0373588 A1* | 12/2016 | Raleigh | ............... | H04M 15/61 |
| 2016/0381210 A1* | 12/2016 | Kenjalkar | ............... | H04M 1/72577 455/419 |
| 2017/0201850 A1* | 7/2017 | Raleigh | ............... | H04W 4/50 |

OTHER PUBLICATIONS

Office Action dated Aug. 25, 2017, for U.S. Appl. No. 14/753,813.
Office Action dated Feb. 26, 2018 for U.S. Appl. No. 14/753,813.
Advisory Action dated May 18, 2018 for U.S. Appl. No. 14/753,813.

* cited by examiner

MANAGING GROUPED STUDENT DEVICES WITH TIMED LOCKS

This patent application is a continuation of U.S. patent application Ser. No. 14/753,813 ("Managing Grouped Student Devices With Timed Locks"), filed Jun. 29, 2015, which is expressly incorporated by reference. This patent application claims benefit of priority to U.S. patent application Ser. No. 14/753,813.

BACKGROUND

Educational institutions, such as schools and universities, constantly seek ways to leverage technology to effectively educate their students. Some schools have attempted to utilize students' mobile devices (such as cell phones, tablets, and laptops) for portions of the learning experience due to the widespread proliferation of these devices. But mobile devices have also proven to be a distraction in the classroom environment, and in some cases, can be used as a tool for cheating.

Attempts to manage student devices in a classroom setting have been largely unsuccessful. In many classrooms, teachers ban mobile devices despite the potential efficiency benefits over pen and paper, because the potential distraction and cheating risks are too high. When an instructor pauses from teaching to request that a student turn off a ringing phone, this interrupts the flow of teaching and learning. Additionally, students can use their unmanaged mobile devices to access the Internet during class and look up answers to exams.

Current technological solutions for limiting use of mobile devices in the classroom are largely device-specific applications that allow parents to place restrictions on their children's devices. For example, a parent can set their child's cell phone to not accept or place calls when located within a geofenced school area. But this can pose problems when a student is no longer in class but still on school campus, and does not address the overarching problem of managing all the mobile devices in a classroom.

Centralized solutions have been largely non-existent, in part because of the many different types of mobile devices available, with disparate operating systems and applications. Additionally, school systems cannot afford to purchase and maintain specialized mobile devices for all of their students. Even if they could, it would not solve the issue of students' personal mobile devices becoming a distraction in class.

Based on at least these problems, a need exists for systems that better manage mobile devices to increase the efficiency of teaching in a classroom environment.

SUMMARY

Examples described herein include systems for grouping student devices into subsets and applying timed locks to those subsets.

In one example, a system allows a teacher (e.g., instructor, professor, or managing user) to manage student devices in a classroom environment. The system can include a server that receives communications from a teacher device and at least one student device.

In one example, the server can send student information to the teacher device. The teacher can use the teacher device to select a group of students on the teacher device and apply a lock to the group. The teacher can select the group of students, a lock type, at least one asset to lock, and timing information for the lock. The teacher device can then send a lock request to the server pertaining to the group, the lock request including an asset identifier and timing information.

In response to receiving the lock request, the server can cause a lock to be applied on the student devices within the group. In one example, the server can determine which student devices are associated with the group. In another example, the teacher device can make this determination and send a separate lock message for each student or student device in the group.

In one example, the server can cause the lock to be applied in part by contacting a messaging server to initiate an application lock on a first student device in the group. The server can also or alternatively send a message to the first student device to control access to the at least one asset in conjunction with the lock. Further, the first student device can execute a learning application having an application program interface. The server can control student access of assets through procedure calls to the application program interface.

Once the locks are applied, the server can confirm the locks to the teacher device. The graphical user interface on the teacher device can display the lock status of all the students in the class.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this disclosure, illustrate various examples and together with the description, serve to explain the principles of the disclosure. In the drawings.

DESCRIPTION OF THE EXAMPLES

Figure 1:
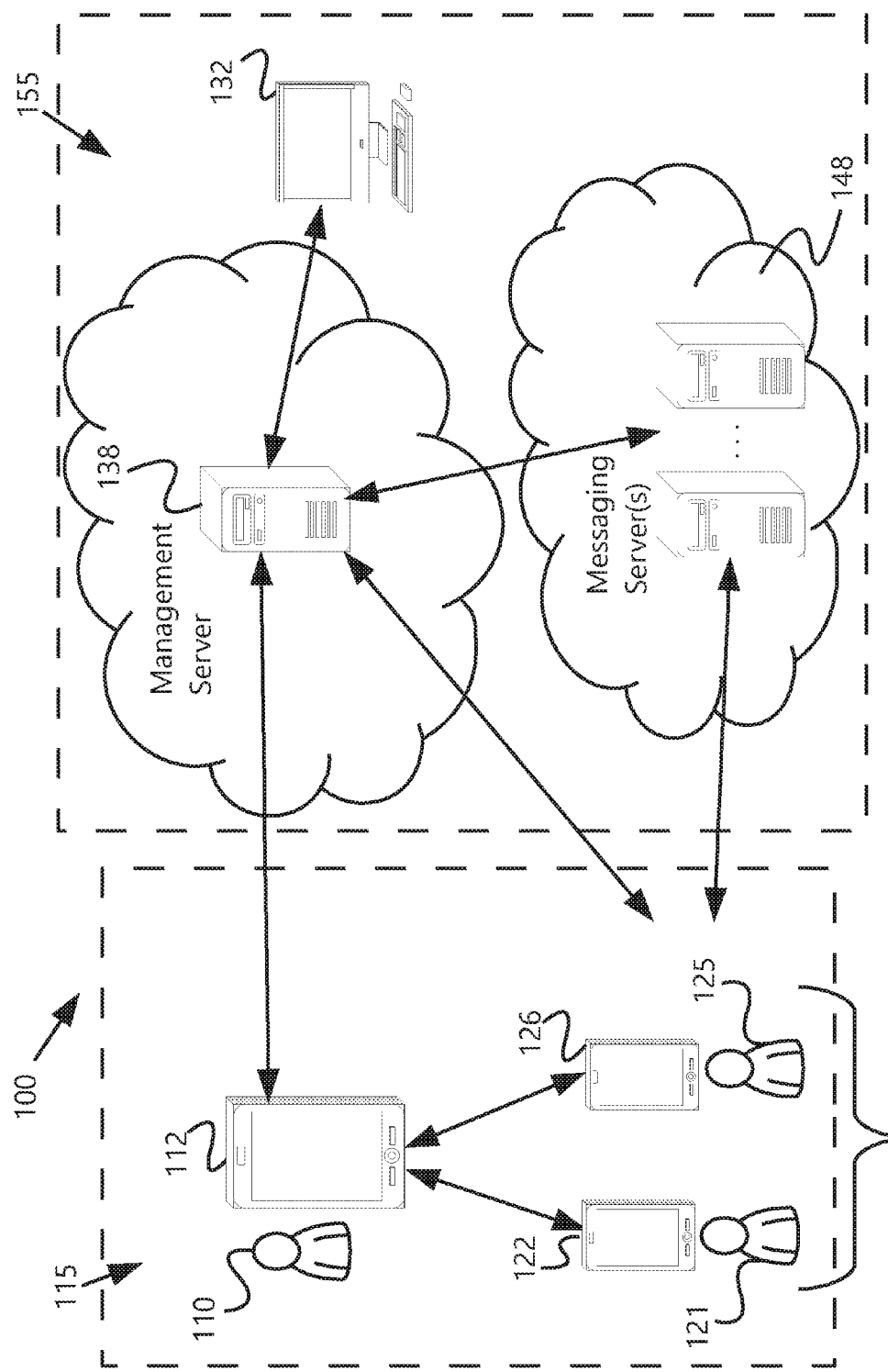
FIG. 1 is an exemplary illustration of a system for managing student devices in a classroom environment.

Reference will now be made in detail to the present examples, including examples illustrated in the accompanying drawings. Wherever possible, the same reference numbers will be used throughout the drawings to refer to the same or like parts.

Examples herein allow a teacher to manage student devices in a classroom to create classroom efficiencies and limit abuses and distractions. In particular, the system can provide the teacher with a graphical overview of students in attendance, and allow the teacher to select groups of students and apply locks to student devices associated with the groups. This can prevent the student devices from accessing personal content that can be distracting. Instead, the teacher can lock student devices into particular applications, documents, and websites. The teacher can also use grouped locking to quickly apply locks to multiple student devices. Grouped locking can also allow a teacher to divide the students in a classroom into multiple groups, such that one group of students can access different resources than another group.

A "student device" is an example of a user device. The user device can be any mobile computing device, such as a cell phone, laptop, or tablet. The "teacher device" is an example of a master device. The master device can be any computing device, including mobile computing devices and stationary workstations. Similarly, a classroom is one example of an environment in which the system can operate. In that example, a class is one type of session for which the system can monitor attendance and apply locks to user devices. Therefore, student devices, teacher devices, and classrooms are exemplary uses of the system but are not meant to be limiting.

In one example, a teacher selects a group of students on a user interface and selects a type of lock to apply. The teacher then selects which assets to apply the lock to, and selects timing criteria for the lock. The lock types can include file locks, web locks, and application locks. File locks can allow a teacher or administrator to whitelist, blacklist, or otherwise restrict which files can be accessed. A web lock can include whitelisting or blacklisting web applications or websites, or otherwise restricting web or the accessibility. Application locks can lock a student device into a subset of managed applications or sub-applications within a locked application. This can include whitelisting, blacklisting, or otherwise restricting which applications or application functionality can be accessed.

The locks can be defined and applied by a management server accessible over a network by the teacher device and the student devices. In one example, a teacher can lock a group of student devices into one or more learning applications, and then lock and unlock resources (i.e., assets) accessible within that learning application. Example resources can include sub-applications, files, and websites that are accessible from within an application. While a device is locked, certain functionality can be disabled. For example, touch input, audio playback, voice call usage, navigation abilities (e.g., to other applications, files, or websites), and other features can be restricted.

Lock timing criteria selected on the teacher device can include a start time, end time, lock duration, or an indefinite lock. The management server can manage turning on and off the locks at the applicable times in one example. In another example, the management server can send the timing information to the student devices for self-management.

A system herein can allow a student to maintain their personal information and personal applications on their student device, while allowing a teacher to limit access to those things during class time. The student device can include an application program interface having procedures for locking the student device into managed applications and restricting resource access for selected time periods. Managed class-specific resources can be uploaded, updated, or even deleted from student devices without impacting the student's personal data.

FIG. 1 shows an exemplary illustration of a simplified system 100 for managing student devices 122 and 126 in a classroom environment, in accordance with an example. In this example, a teacher 110 having a teacher device 112 can manage student devices 122 and 126 used by students 121 and 125 in the teacher's class. Although only two students 121 and 125 are pictured, the class may include one or more students 120, each having one or more student devices.

The teacher device 112 can include a non-transitory computer-readable medium containing instructions that are executed by a processor in the teacher device 112. Examples of a non-transitory computer-readable medium include RAM and ROM, disks, and other memory and storage that is accessible by a USB port, a floppy drive, CD-ROM, or DVD-ROM drive, and a flash drive, among others. The instructions cause the teacher device 112 to carry out stages necessary to communicate with student devices 122 and 126 and a management server 138. Likewise, a student 121 can use a student device 122 that includes a processor that executes instructions to carry out additional stages necessary to communicate with the teacher device 112, the management server 138, and/or a messaging server 148.

The teacher device 112 and student devices 122 or 126 can be considered computing devices for the purposes of this disclosure. The computing devices can be any processor- or controller-based device for displaying, storing, receiving, and transmitting information. For example, a computing device can be a cell phone, smart phone, tablet, laptop, personal computer, or television. Other examples of computing devices include any portable or non-portable, processor- or controller-based device. Additional example computing devices are discussed below, and any device capable of transmitting, receiving, storing, or displaying the content discussed herein is contemplated. The teacher device 112 can be a stationary computer in an example, such as a workstation in a classroom, or a mobile personal device in another example.

In the example of FIG. 1, the teacher 110 can use his or her computing device 112 to group students and manage student devices 122 and 126 functionality based on the groups. The teacher device 112 can first track the presence of student devices 122 and 126 based on peer-to-peer communications 115. Management services can be accomplished in conjunction with attendance tracking, but can further utilize a server-based network 155.

The teacher device 112 and student devices 122 and 126 can broadcast attendance information with peer-to-peer communications 115. These communications 115 can rely on one or more wireless transmission protocols such as Bluetooth, local WIFI connectivity, or other peer-to-peer communication protocols in an example. The peer-to-peer transmissions 115 can occur directly between devices 112, 122, and 124 without the need for a server to manage real-time attendance-related communications or information transfer in one example.

The system can additionally implement a server-based network 155 for management services. The server-based network 155 can include the management server 138, an administrative console 132, and the messaging server 148. One or more of the devices 112, 122, 124, 138, and 148 can include an interface for communicating over the network 155. The network can include the Internet, a local area network, or any other suitable communication platform. The interface can include one or more modulators, demodulators, multiplexers, demultiplexers, network communication devices, wireless devices, antennas, modems, and any other type of device configured to enable data communication through a communication network.

The management server 138 can be responsible for storing which student devices 122 and 126 correspond to which students 120. The management server 138 can also store which students 120 correspond to which classes, and which teachers 110 and teacher devices 112 correspond to which classes. These relationships can be stored in a database that is part of or accessed by the management server 138. The management server 138 can also be responsible for coordinating and storing locks for files, applications, and web access, and facilitating the locking of particular student devices 122 and 126.

Student devices 122 and 126 can be personal devices that include personal applications and data. But through use of a management component, the management server 138 can lock the student device 122 into particular applications, files, and websites as part of class. The management component can include a device-level component (e.g., application programming interface (API), agent application, hypervisor, or virtualized device) and an app-level component (e.g., API, SDK, app wrapper, or workspace agent app). The device-level management component can include system level privileges. The app-level management component can include privileges in managed applications that are signed or developed for operation with the management sever 138. Reference to the management component is understood to include either or both of the device-level and app-level components unless otherwise specified. The management server 138 can interact with the management component with calls to the application (e.g., app level) or operating system (e.g., device level) of the student device 122.

As part of the locking operation and as more fully described below, the teacher device 112 can initiate a lock or remove a lock by contacting the management server 138 over a network, such as the Internet. The management server 138 can be in communication with student devices 122 and 126 and/or messaging server 148 over the Internet or other network(s). Upon receiving a lock request (e.g., instruction) from the teacher device 112, the management server 138 can utilize a management component to send one or more messages to the student device 122. The management server 138 can transmit commands to a messaging server 148 as part of that process. This may cause the student device 122 to contact the management server 138 for an instruction (e.g., rather than maintaining an open socket with the management server 138).

Different operating systems can have different device-level management component procedures to leverage for locking various resources. Based on the operating system of the student device 122, the management server 138 can determine a messaging server 148 to contact. For example, if the first student device 122 is running a first operating system, the management server 138 can contact a first messaging server 148 that is configured for communications with the first operating system of the first student device 122. The management server 138 can likewise determine that the second student device 126 utilizes a second operating system and, as a result, contact a second messaging server 148 that can interact with the second operating system. The second messaging server 148 can contact the second student device 126, causing the second student device 126 to fetch a lock instruction from the management server 138.

In one example, a teacher 110 can initiate a lock on a group of student devices 122 and 126 by selecting icons associated with respective students 121 and 125. Selection students 121 and 125 can create a group on the graphical user interface displayed on the teacher device 112. (For the purposes of this disclosure, selecting students is understood to also mean selecting the student's associated student devices 122 and 126.) After the group is selected, the teacher 110 can select a type of lock to apply, including an application lock, file lock, web lock, or lock profile with a combination of those lock types. The teacher device 112 can then be presented with various assets (i.e., resources) to which the lock type can apply. After selecting which resources should be locked, the teacher 110 can also select timing information for the lock.

When the selections are complete, the teacher device 112 can send a lock request to the management server 138 to apply the specified lock on the selected group of student devices 122 and 126. The lock request can occur as a series of messages in one example. For each student device 122 and 126, the management server 138 can query a database to determine the operating system (OS) for that student device 122 or 126. Then, the management server 138 can instruct the applicable messaging server 148 to contact the student device 122 or 126. This can cause the student device 122 or 126 to check with the management server 138 to receive a lock instruction. At that point, the management server 138 can send lock instructions the student device 122 or 126.

The database utilized by the management server 138 can include one or more software and/or hardware components that cooperate to store, organize, sort, filter, and/or arrange data used by system 100 and at least one processor on the management server 138. For example, the database can include user account information, class information, device settings, and other user preferences or restrictions. The database can also contain multiple databases that are communicatively coupled to one another and/or the processor, which can be one of multiple processors utilized by the management server 138 or a computing device 112, 122, 126, or 132.

In one example, the database can include one more tables that store a session identifier (e.g., class identifier), a session description (e.g., class description), at least one session (e.g., class) start time and end time pair (e.g., datetime data type that includes both a date and a time). In one example, a separate table links a class identifier to start and end dates and times. A table can also link a teacher identifier to one or more class identifiers. A further table can link one or more student device identifiers to a class identifier. A table for mobile device information can include columns for a device identifier, operating system type, a corresponding messaging server type, message server electronic contact information, student information, and/or other information.

Management server 138 and messaging server 148 can each include one or more servers. For example, messaging server 148 can include at least one server owned by third parties located at different locations, each of which are responsible for sending messages to student devices 122 and 126 that can be running different operating systems with which different messaging servers 148 can communicate. In one example, the management server 138 and messaging server 148 are part of the same server. In another example, system 100 can use its own messaging server 148, alone or in combination with messaging servers for a particular operating system.

An administrative console 132 can allow an administrator user (not pictured) to create default locks that can be selectable with the teacher device 112 in one example. For example, the administrator user can create a lock profile that is relevant for a math class. The lock profile can allow access to only a select few websites and only a particular calculator application. This example lock profile can contain a series of lock types, such as a web lock and an application lock. In another example, a lock profile can be updated to new configurations based on upcoming lesson plans. The teacher 110 can select the lock profile on the teacher device 112 and cause the series of pre-configured locks to be applied to a selected group of student devices 122 and 126.

The administrator can further specify resources to send to the student devices 122 and 126. A messaging server 148 can contact the student devices 122 and 126 to prompt them to download the resources from the management server 138. In this way, students 121 and 125 in a particular class can receive relevant documents prior to class that are used for learning during class. Then the teacher 110 can lock the student devices 122 and 126 into those documents.

The computing devices (e.g., teacher device 112 and student devices 122 and 126) can utilize software locally on the respective device to facilitate the lock functionality. The software can include a set of instructions stored remotely on a computer-readable medium, such as at management server 138. Users can access the instructions, such as over the Internet, downloading them to the respective computing device for local execution. Execution of these instructions by a student device 122 and/or teacher device 112 can allow the respective computing devices to coordinate with each other, as well as management server 138 and/or messaging server 148 in an example.

The devices 122, 126, 138, and 148 can each utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors, each configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The devices 122, 126, 138, and 148 can also include an I/O module, such as a console with an integrated keyboard and mouse to allow a user to input parameters associated with system 100. An I/O module can also include a display including a graphical user interface (GUI) for outputting information on a screen.

Figure 2:
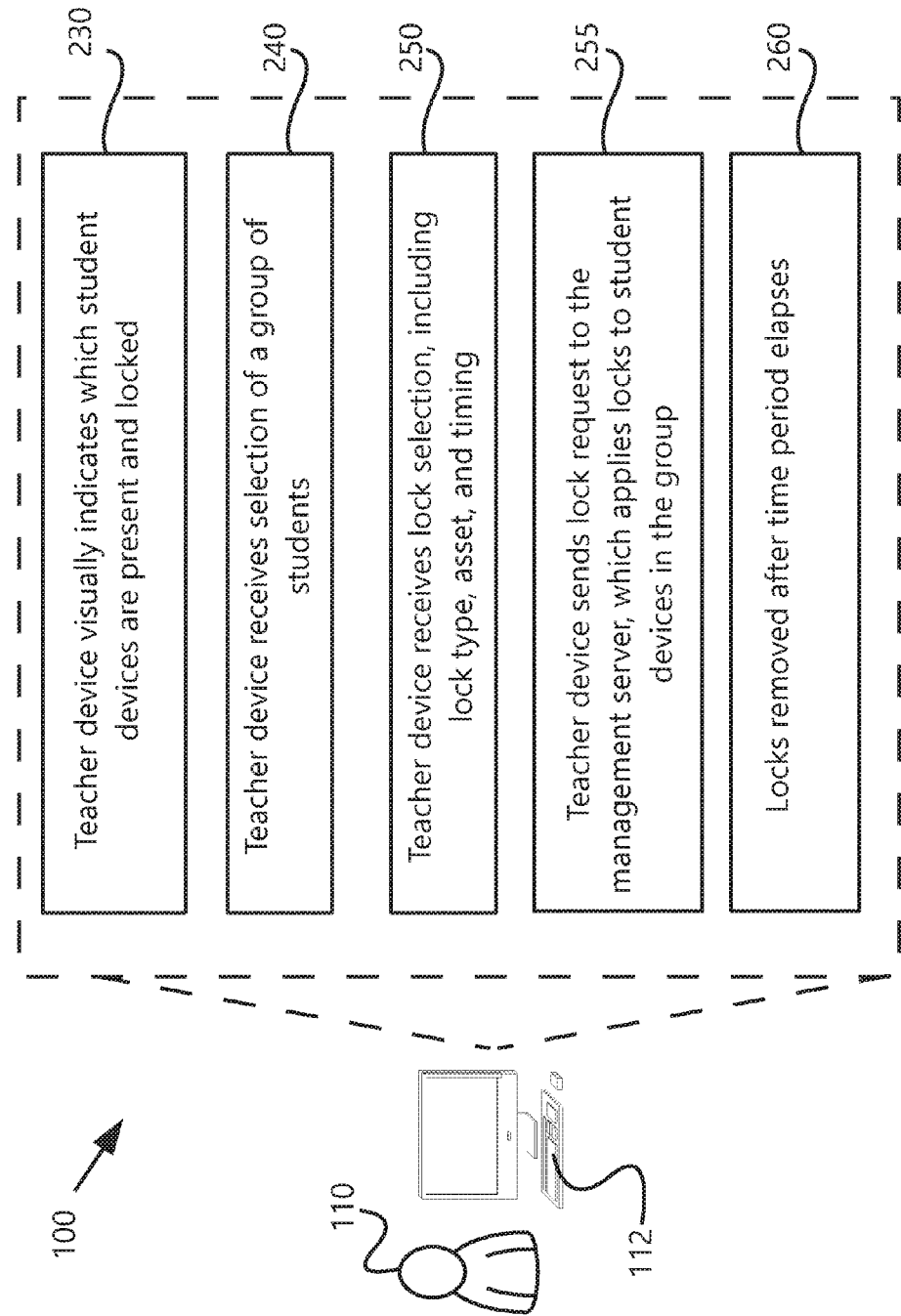
FIG. 2 is an exemplary illustration of a system for managing student devices in a classroom environment.

Turning to FIG. 2, an exemplary overview of stages performed in the system 100 is presented.

At stage 230, the teacher device 112 can visually indicate which student devices are present. To detect present student devices, the teacher device can instantiate a multipeer manager object. The multipeer manager object can fetch class metadata, such as a class identifier, class name, and class teacher information from core data. The multipeer manager object can then browse for a matching service type transmitted from student devices 122 and 126 through a peer-to-peer communication protocol. The service type can include a class identifier associated with the selected class, and a device identifier corresponding to the student device 122. The class identifier can be set by an administrator or administrative process in one example.

The multipeer manager object can scan for a service type including the class identifier (which is a session identifier). For example, a service type can include a string format in an example that includes "cl-[class identifier]". The multipeer manager object can also hold a reference to the device identifier (unique to the teacher device 112) and a communication session identifier. The communication session identifier can become active once the student device 122 and teacher device 112 connect with one another. The communication session identifier can become void when the connection is inactive or suspended. Whereas a session identifier can identify a session (such as a class), a communication session identifier is specific to direct communications between two devices 112 and 122.

When a service type with a matching class identifier is detected, then the teacher device 112 can use the multipeer framework to receive a device identifier from the connected student device 122. The teacher device 112 can then compare the received device identifier to stored device identifiers that are registered for that class. If the received device identifier has a match, the teacher device 112 can indicate the student device 122 is present. The indication can include visually differentiating within the GUI the detected student from those who have not yet been detected by the teacher device.

At stage 240, the teacher device 112 receives a selection of a group of students (i.e., more than one). Groups can be selected by clicking or tapping multiple students (i.e., icons on a display of teacher device 112 associated with students and/or student devices 122 and 126, also referred to as representations). Different colors can be used to distinguish different groups. Groups can also be saved in one example so that a teacher can easily recall previously-created groups at the beginning of each class, such as by hitting a "recall group(s)" button. The groups can be stored on the management server 138. Alternatively, they can be stored on the teacher device 112.

At stage 250, the teacher device 112 receives a lock selection from the teacher 110 to apply to the selected group of students. The lock selection can include a lock type, asset(s) to lock, and timing information. For example, the teacher 110 can select between an application lock, a file lock, a web lock, or a custom lock profile that combines the other lock types.

Upon receiving selection of the lock type, the teacher device 112 can display at least one asset (i.e., resources) to which the lock type can be applied. For example, for an application lock, the teacher device 112 can display a list of applications that the student devices 122 and 126 can be locked into. For a file lock, the teacher device 112 can display a list of files the student devices 122 and 126 can access. For a web lock, the teacher device 112 can display a list of websites that can be whitelisted for access. These lists can be downloaded from the management server 138 in one example, either beforehand or contemporaneously with the selection.

Once assets are selected, the teacher device 112 can receive selection of timing information for the lock. For example, the teacher 110 can choose between an indefinite lock, a lock with an end time, a lock with a start time, and/or a duration for the lock.

At stage 255, the teacher device 112 transmits a lock request to the management server 138 to apply a lock to the selected group based on the selections. In one example, the lock request can include separate messages for different student devices 122 and 126 in the group. The messages can also include lock selection information. In another example, the lock request identifies a group of students in a single message.

Upon receiving the lock request, the management server 138 sends lock instructions to the group of student devices 122 and 126. This can include contacting one or more message servers 148 to initiate application locks or to cause the student devices 122 and 126 to contact the management server 138 to receive the lock instruction.

The timing information can be sent to the group of student devices 122 and 126, in one example. In that example, at stage 260 the student devices 122 and 126 will unlock themselves at the specified time even if they are no longer able to connect to the management server 138. In another example, the management server 138 uses the timing information to schedule tasks for removing the locks from the group of student devices 122 and 126. In this example, at stage 260 the management server 138 can send unlock commands (or cause the student devices 122 and 126 to retrieve the unlock commands) at the scheduled time(s). The approach may vary between student devices 122 and 126, based on the management component procedures available at each specific device 122 and 126.

In one example, timing for locking or unlocking the locks can be staggered to fit a lesson plan. For example, certain files, such as answers, can be locked until the end of class. Other files, such as a lesson file, can be available at the beginning of class but not toward the end, when a quiz file can become unlocked. In this an example, a pre-loaded lock profile can be selected by the teacher device 112 to automate the lock stages described above for more complex locking schemes.

In one example, a teacher 110 can set up a first group and a second group with different timed locks, such that the groups will need to work together to access all the assets needed for completing a lesson plan. This can encourage collaborative learning that current technologies cannot match without opening the door to cheating and other distractions.

Additionally, the teacher device 112 can send resources to student devices 122 and 126 in one example by routing the resources to the management server 138 for download to the student device 122. These resources can be added on the fly by the teacher device 112 or management server 138 to a whitelist of available assets in one example. The student device 122 can be notified through a management component to contact the management server to negotiate managed resource downloads or uploads.

Figure 3:
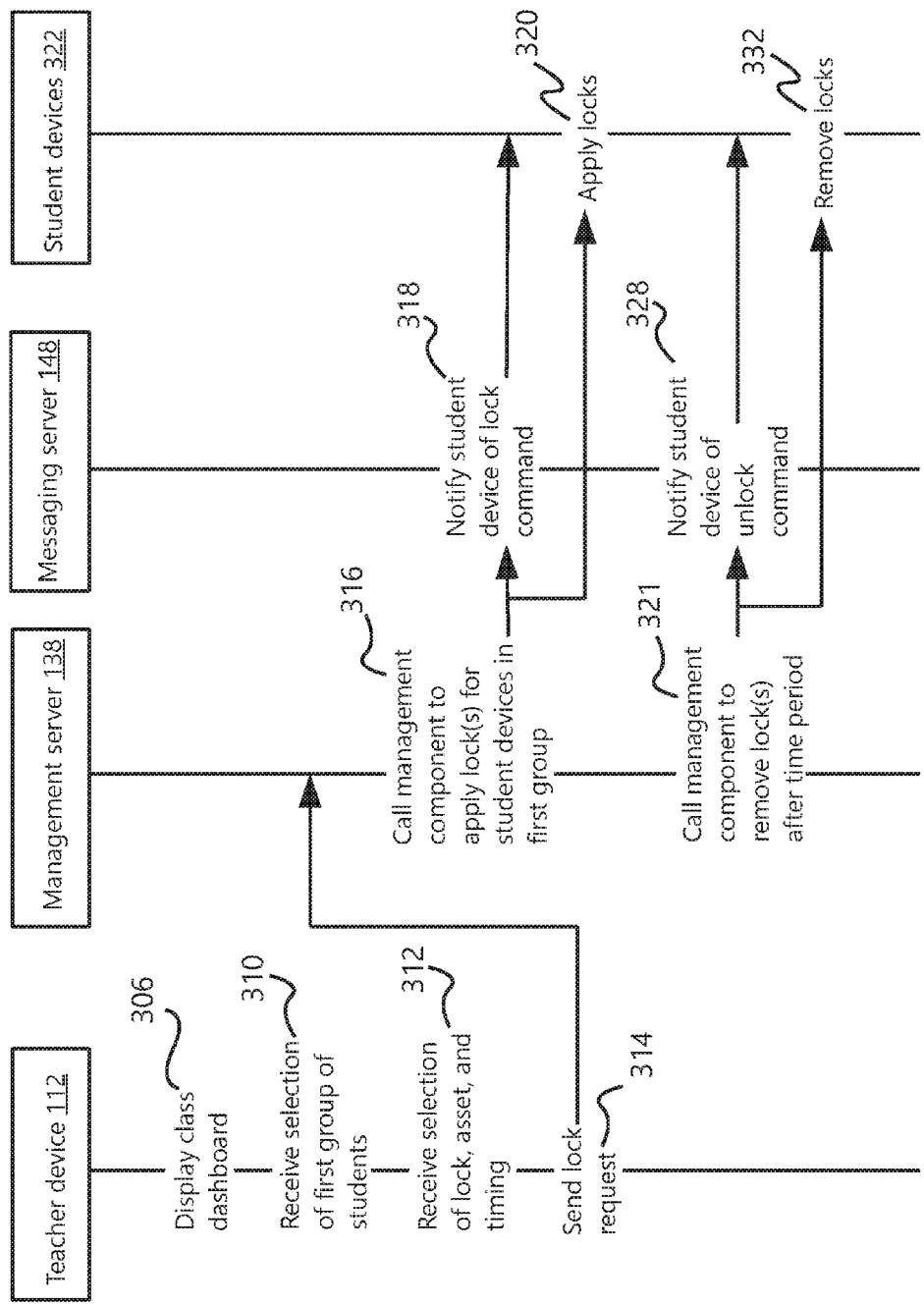
FIG. 3 is an exemplary flow chart with example stages for managing student devices in a classroom environment.

FIG. 3 shows an exemplary flowchart of steps performed by a teacher device 112, management server 138, messaging server 148, and a group of student devices 322, in accordance with an example.

At step 306, the teacher device 112 displays a class dashboard as part of a graphical user interface (GUI), which is further explained with respect to FIGS. 6A-6E. The GUI can allow the teacher 110 to select between their classes. For a selected class, the GUI can provide a snapshot of student attendance based on direct peer-to-peer broadcasts and communications with student devices 322.

The class dashboard can be populated based on data received from the management server 138. For example, the management server 138 can send class and student device 322 information to the teacher device 112 based on the teacher identifier and/or class identifier. The teacher device 112 can download this information prior to the class beginning. The download can be performed as a periodic task (e.g., nightly or weekly), in one example. The downloaded information can populate the GUI of the teacher device 112, ensuring that the teacher 110 can select between appropriate classes and that the correct student devices 322 and 126 are associated with each class.

At step 310, the teacher 110 can select on the teacher device 112 a first group of students that are presented on the screen. The selection can be made with a touchscreen or with a mouse, depending on the example. For example, the teacher 110 can tap on one or more icons (i.e., representations), each associated with a student and/or student device, to create a first group of students.

At step 312, the teacher 110 can use the teacher device 112 to select a lock to apply to the selected group of student devices 322. This can include selecting the type of lock, the assets to which the lock will apply, and the timing of the lock in one example. This can cause the teacher device to apply the lock at step 314 by sending a lock request to the management server 138.

Upon receiving the lock request from the teacher device 112 (which can involve multiple back and forth communications), at stage 316 the management server 138 can interpret the lock request and determine which management component calls to make to cause each student device 322 to perform the lock. Because different student devices can operate on different operating systems, the management component calls can be selected based on compatibility with a device-level management component and/or operating system on the respective student device 322.

As part of this decision making, the management server 138 can determine whether to contact at least one message server 148 based on the lock to be applied. The management server 138 can contact the messaging server 148 to have the messaging server 148 notify the student devices 322 that the management server 138 has a message waiting for the student devices 322. The student devices 322 can then contact the management server 138 and receive the instruction regarding one or more locks within the selected application (e.g., the learning application). In another example, the teacher device 112 causes the student devices 322 to contact the management server 138. In still another example, the management server 138 can directly access a management component on the student devices 322 without intervention from a third-party messaging server 148.

Utilizing the management components and/or operating systems installed on the student devices, at stage 320 the locks can be applied to student devices 322.

In one example, the management server 138 sends the timing information to the student devices 322. When the student devices 332 apply locks at stage 320, the timing information can be utilized to set a task to remove the lock at a predetermined time or after a certain amount of time has passed at stage 332.

In alternate examples, the management server 138 can store the timing information or use it to schedule a future task for unlocking the locks set at stage 320. When the task occurs, at stage 322 the management server 138 can send unlock commands to the student devices 322. The unlock process can include the management server 138 determining which resources to unlock and making management component calls commiserate with unlocking those resources. This can also include contacting the relevant messaging server 148 at step 328. The messaging server 148 can send a command to unlock the student devices 322 at step 330, or cause the student devices 322 to fetch unlock instructions from the management server 138.

Because the student devices 322 can include different operating systems with different security permissions and management component capabilities, the management server 138 can store timing information and manage the unlocking for some of the student devices 322. The management server 138 can send the timing information to student devices 322 that are capable of receiving it and unlocking themselves at the specified time without further contact and/or input needed. Some student devices 322 can execute software or an operating system having a management component with this self-unlocking functionality. Other student devices 322 that do not utilize the same management component can require the management sever 138 or messaging server 148 to contact the respective student device 322 later when the timing information indicates the lock should be removed.

Figure 4:
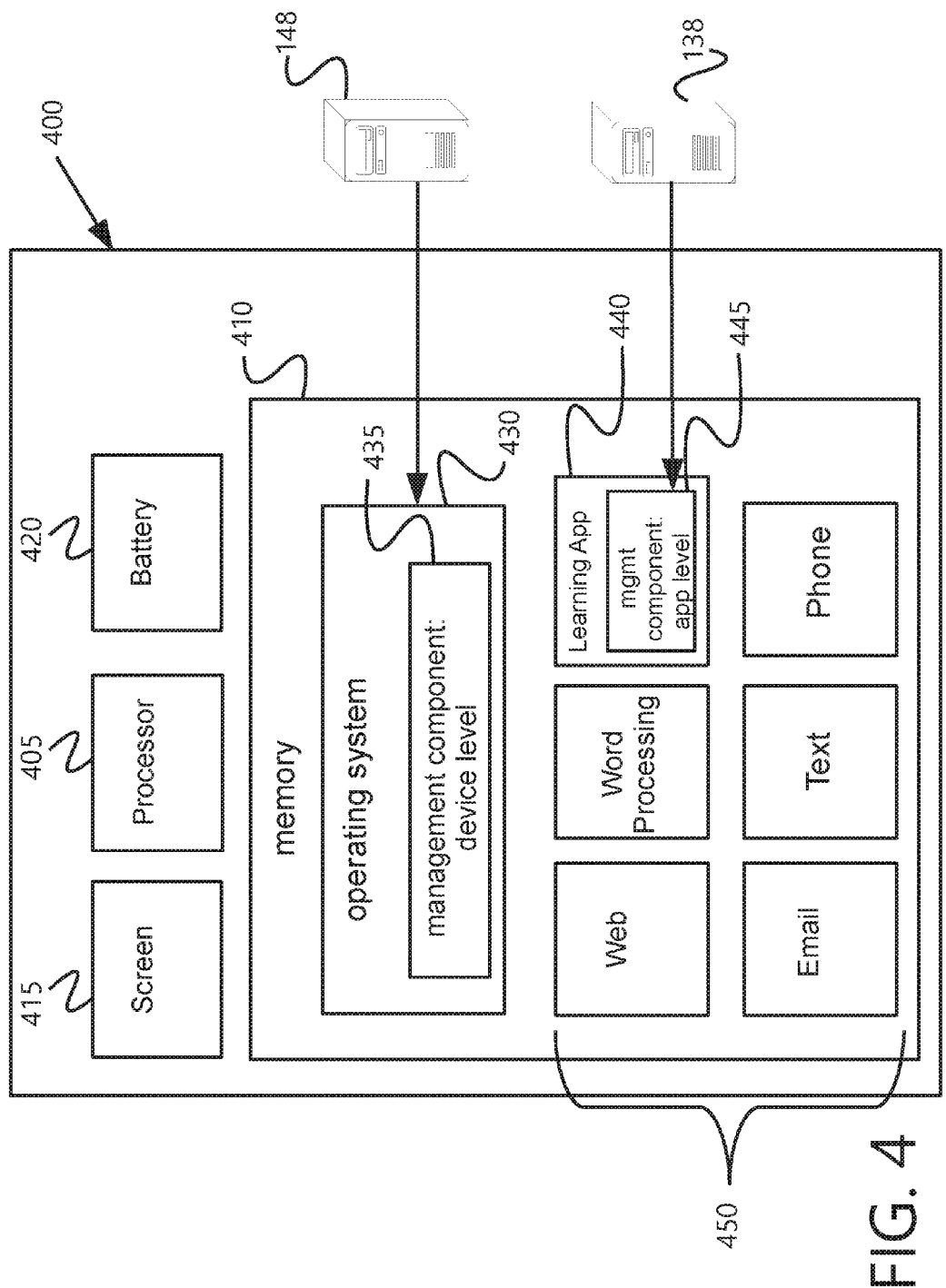
FIG. 4 is an exemplary illustration of system components.

FIG. 4 is an exemplary illustration of hardware and software running on a student device 400. The processor 405 can be powered by a battery 420 and execute instructions stored on a non-transitory computer-readable medium 410. These instructions can cause the student device 400 to run software for use in a classroom environment, including device-level management component 435 and/or app-level management component 445 for implementing management services. The student device 400 can also include a screen 415 for displaying a graphical user interface.

The processor 405 can execute instructions to run an operating system 430, in one example. The operating system 430 can execute a device-level management component 435 that includes procedure calls for managing applications and other device functionality. For example, the device-level management component 435 can include a procedure call for locking the student device 400 into a single application. This can allow administrators and teachers to lock the student device 400 into learning application 440 or otherwise restrict the student device 400 functionality in a learning environment. Device-level management component 435 can also include procedures for causing the student device 400 to contact the management server 138 and fetch an instruction or lock.

A student can maintain all of their personal data and applications on their student device 400 (e.g., in unmanaged applications). But during class, the management server 138 can configure (e.g., lock) the student device 400 to disallow access to apps and other resources that are unmanaged and can serve as distractions. In addition, the class-specific apps can be easily uploaded, updated, or even deleted from student device 400 by an administrator of the management server, for example, when the school year ends. To facilitate the management services, the student device 400 uses a combination of the device-level management component 435, the managed applications 450, and app-level management component 445.

The management server 138 can cause a student device 400 to lock into an application by calling device-level management component 435 procedures in the operating system 430 to invoke a single application mode. Single application mode can restrict the student device 400 to only running, for example, the learning application 440 and other essential processes. In this way, the student's personal data can be isolated and locked from use while at class.

In another example, the management server 138 can lock the student device 400 into multiple "managed" applications 450 using procedure calls at the device-level management component 435 and/or application-level management component 445. In this example, the student can toggle between the managed applications. The teacher can also whitelist or blacklist some of the managed applications so that the student can only access a subset of the managed applications 450. This can also be facilitated by locking into a single application that can access one or more sub-applications. Applications can be locked and unlocked by the management server 138 through application-level APIs 445 as well.

In the illustrated example, the managed applications 450 that a user can be locked into using management component 435 include a web browser, word processor, email, texting application, phone application, and a learning application. These managed applications 450 are exemplary only. Other applications can be updated or sent to the student devices 400 by the management server 138. In this way, applications of specific relevance to a class can be loaded onto the student device 400 and managed with locks discussed herein.

In one example, the management server 138 can also control which resources the learning application 440 can access through procedure calls available at an application-level management component 445. These resources can include files and sub-applications, such as email or web browsing. The management server 138 can make procedure calls at the application-level management component 445 to implement file locks and web locks on resources. The application-level management component 445 can control other functionality as well. The file lock can restrict which of the files a student can access from within the learning application 440. The application lock can enable or disabling sub-applications within learning application 440.

Thus, in one example, a teacher can restrict resource (e.g., asset) access by causing the management server 138 to perform a two-step lock. First, the management server 138 locks the student device 400 into the learning application 440. Second, the management server 138 restricts which resources are available from within that application 440 by applying file locks, web locks, and/or application locks.

Whereas a messaging server 138 can be utilized for locking and unlocking the student device 400 into managed applications 450 through the operating system 430 device-level management component 435, the management server 138 can be responsible for setting resource-specific locks using the application-level management component 445 in one example. The resource-specific locks can include which sub-applications to lock, which files to lock, and which websites to lock. This can give teachers the ability to tailor student device 400 functionality from class to class.

In another example, the management server 138 can utilize the app-level management component 445 to send files to the student device 400. The student can then modify and upload the files back to the management server 138. From there, a teacher device 112 can download the modified files.

In one example, if the student device 400 is not locked exclusively into the learning application 440 during a class period, the learning application 440 can cause the student device 400 to broadcast a session with the class identifier and a code that notifies the teacher device 112 that the learning environment is not secure for that student. In another example, the learning application 440 can cause the student device 400 to notify the management server 138 regarding learning environment insecurity. The management server 138 can then attempt to reapply one or more locks. The learning application 440 can detect that the student device 400 is not in single application mode by checking a flag in the operating system 430, in an example.

Figure 5:
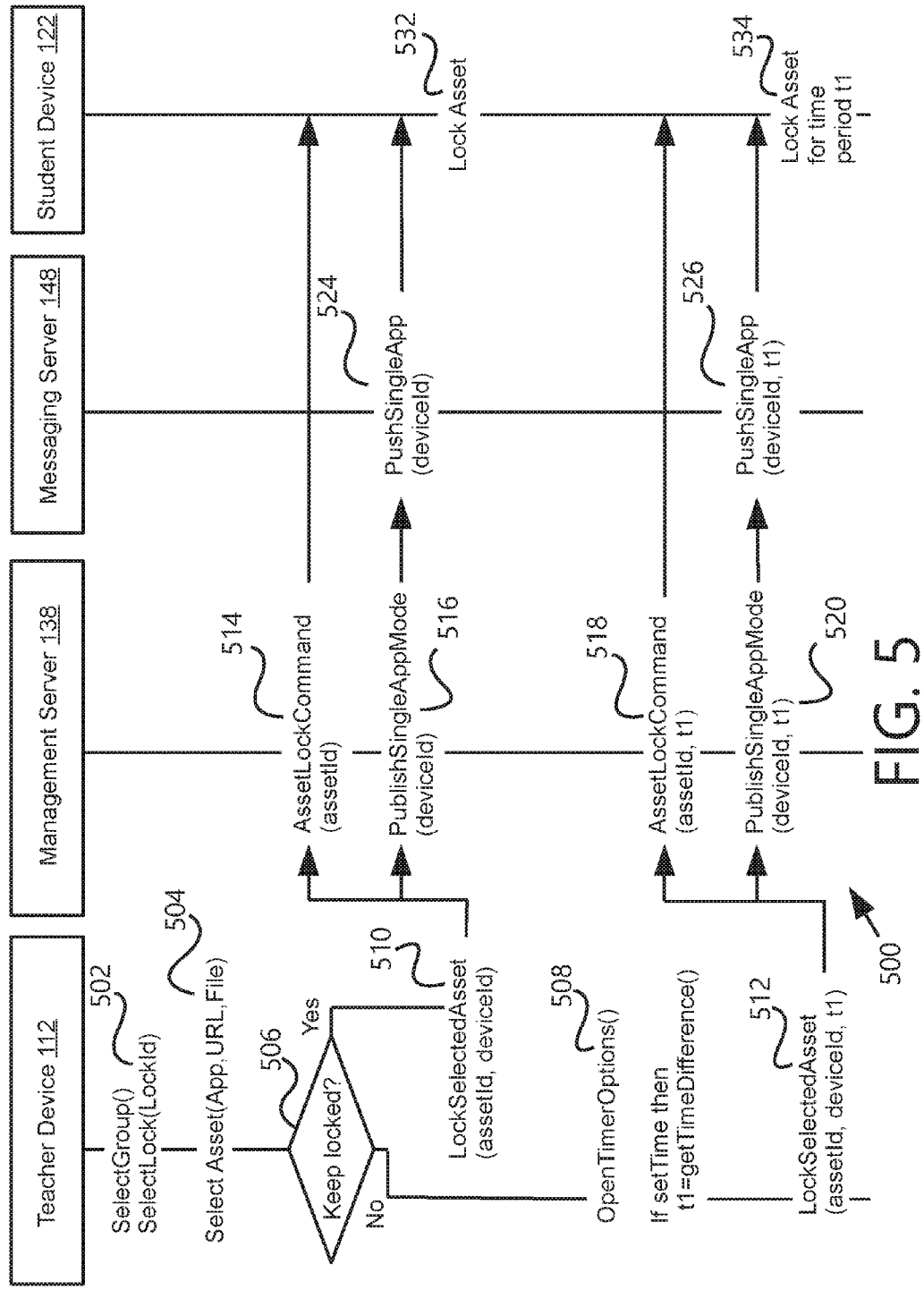
FIG. 5 is an exemplary flow chart with exemplary procedure calls.

Turning now to FIG. 5, an exemplary illustration is presented that includes procedure calls involved in locking groups of student devices.

At stage 502, the teacher device 112 executes one or more procedures involved in selecting a group of student devices 122 and 126. For example, the teacher device 112 can determine the device identifiers associated with each selected student in the group. In another example, a procedure can recall a previously-stored group so that teacher can build default groupings. This can help, for example, if a subset of the student devices 122 and 126 in a class have additional assets that need to be separately locked or whitelisted on a regular basis. Alternatively, a subset could have more advanced locking options (e.g., due to being computing devices) that the teacher can take advantage of.

At stage 504, the SelectAsset procedure can include selected applications, URLs, files, or other resources for the student devices 122 and 126 to lock into or out of.

At stages 506 and 508, procedures can be executed relevant to timing information selection. The teacher device 112 can display timing options. If the teacher selects an option to keep the asset locked, then the LockSelectedAsset procedure can execute at stage 510, having at least an asset identifier and device identifier included. This can generate a lock request that is sent to the management server 138.

Otherwise, the timing information can be included as an input to the LockSelectedAsset procedure at stage 512, which can generate a lock request including timing information that is sent to the management server 138. The format of the timing information can be manipulated prior to supplying it to the management server 138. In one example, at stage 508, a set time is translated into a time difference before sending the timing information to the management server 138.

In one example, the teacher device 112 can loop through all device identifiers in the selected group, performing stages 510 or 512 for each device identifier. Similarly, the teacher device 112 can loop through asset identifiers as these stages are performed in an example. For the purposes of this disclosure, individual messages sent to the management server 138 or all the messages collectively can be considered to be a lock request.

At stages 514 and 518, the management server 138 can execute the AssetLockCommand procedure for each asset identifier that is part of the lock request. In stage 518, timing information can also be used in the procedure. The procedure can allow the management server 138 to control the asset at the student devices 122 and 126 of the group at stage 532, such as by making management component calls at each student device 122 and 126. The management server 138 can send timing information to the student devices 122 and 126 at stage 518.

In one example, stages 514 and 518 are executed after a student device 122 contacts the management server 138. This can be accomplished by the management server 138 directing a messaging server to notify the student device that a lock instruction is waiting, such as at stages 516 and 520.

At stages 516 and 520, the management server 138 can execute a procedure to establish single application mode or otherwise lock the group of student devices 122 and 126 into one or more managed applications. The procedure call can include supplying a device identifier as an input. The management server 138 can utilize the device identifier to determine from database records which messaging server is associated with each student device 122. Based on that, the management server 138 can determine where to send the message and what the format of the message should be. The message can be sent to the messaging server, causing it to contact each student device 122 at stage 510 to enable single application mode and/or to execute stages 514 and/or 518.

At stages 532 and 534 the locks can be applied.

Figure 6A:
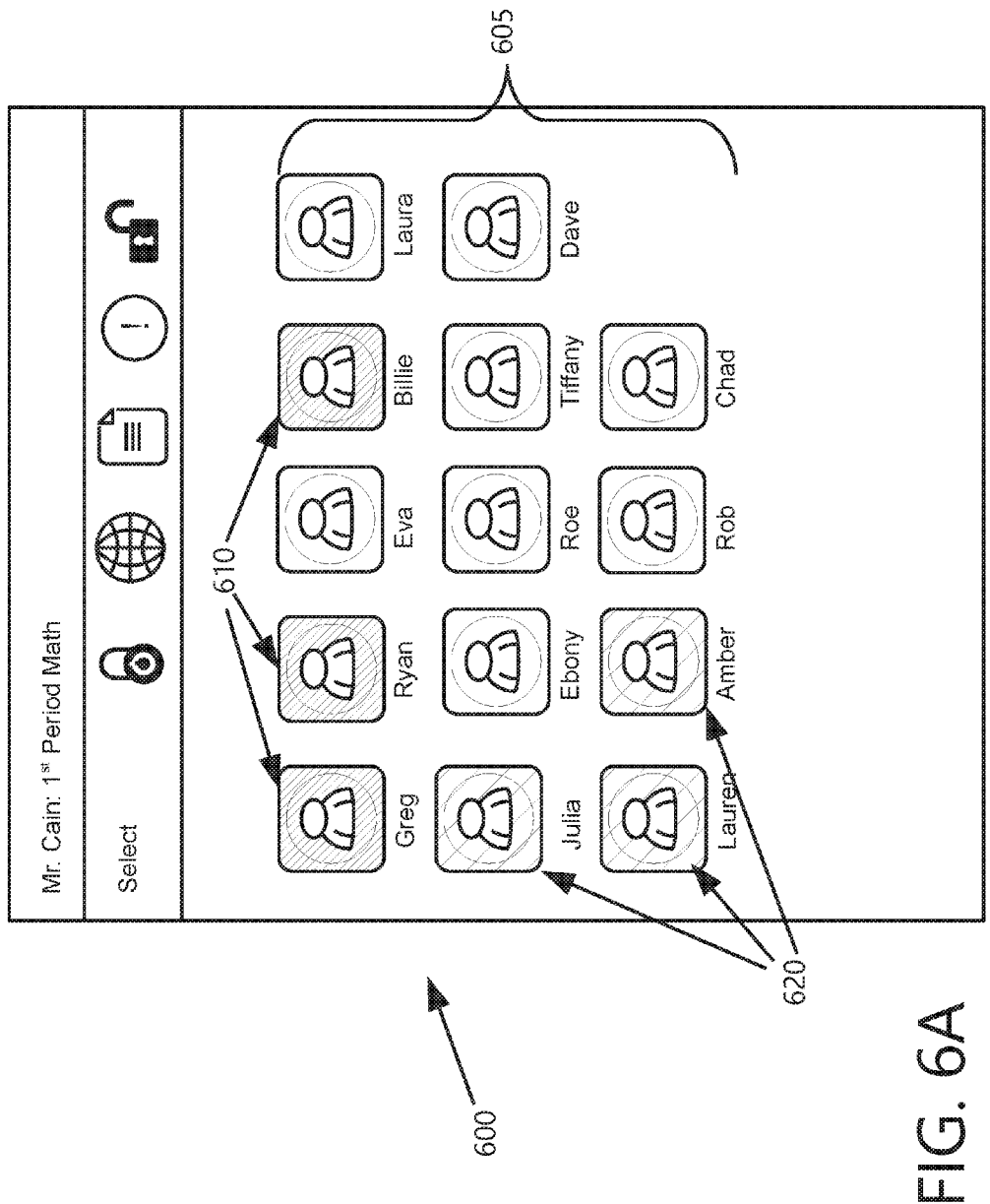
FIGS. 6A-6E are exemplary illustrations of a graphical user interface.

As shown in FIG. 6A, icons 605 representing the students associated with Mr. Cain's 1st Period Math class are displayed on a graphical user interface (GUI) 600 on the screen of Mr. Cain's teacher device 112. In this example, the teacher 110, Mr. Cain, has selected two different groups 610 and 620 of students, each of which can be highlighted differently. The first group 610 in this example is Greg, Ryan, and Billie. The second group 620 in this example is Julia, Lauren, and Amber.

Attendance can also impact group selection for locking purposes. The teacher device 112 can automatically remove student devices from group locking if they are not present. This can avoid locking a student device 122 that is not actually in the class that day. Additional distinguishing color or shading can be applied to individual icons based on attendance detected over peer-to-peer connections. Additional visual distinctions can also alert a teacher 110 that locks are not or will not be applied to particular devices within a group until the student device becomes present.

In another example, the teacher device 112 sends current attendance information to the management server 138 to validate the locks either beforehand or contemporaneously with the lock requests. In another example, the management server 138 periodically contacts either the teacher device 112 or a student device that was not marked as present to determine if the student device has become present, at which point the lock can be applied to that student device. The management server 138 can also periodically ping an absent student device in one example. In that situation, the management server 138 can apply the lock upon receiving communication from the student device and determining that it is in the same location as the corresponding teacher device 112 during class time.

FIGS. 6B-6E include example graphical user interfaces that can be used on a teacher device 112 to facilitate group locking.

Figure 6B:
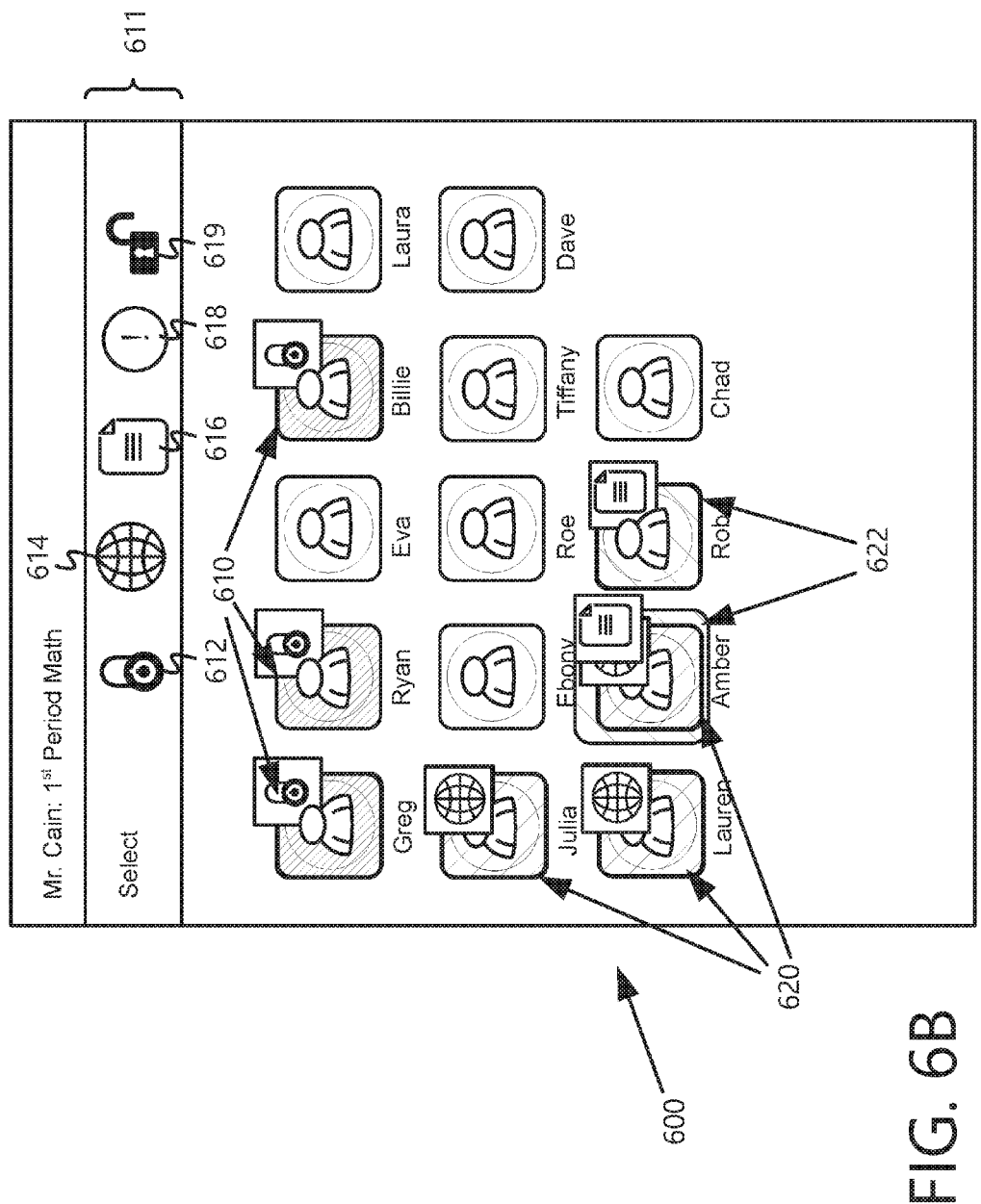

Turning to the example of FIG. 6B, the graphical user interface 600 can present visual indicators of locks that can be applied to student devices. In this example, an application lock 612 has been applied to the first group 610 of Greg, Ryan, and Billie. A web lock 614 has been applied to the second group 620 of Julia, Lauren, and Amber. Amber has also been grouped with Rob to form a third group 622, to which a file lock 616 has been applied.

In one example, the teacher can set different locks on different groups based on subsets of the class participating in different tasks within the class. As class progresses and the groups rotate to different tasks, the lock profiles can rotate as well. The rotating locks can be set at the management server 138 to automatically rotate. Mutually exclusive resource restrictions between two or more groups can also be used to encourage collaboration between the groups.

In this example, lock types can be selected at tool bar 611. A first lock type can be an application lock 612. The application lock 612 can lock the student device into one or more managed applications or sub-applications, preventing the user from using other functionality (e.g., phone calls) during class.

In one example, the teacher can cause new managed applications to be downloaded by the student devices, and control access to these applications with a timed application lock.

A second lock type can be a web lock 614. The web lock 614 can restrict website access from within managed applications. A whitelist stored at the management server 138 can dictate which websites the student device can visit. The web lock 614 can cause the student device to download the whitelist (or a blacklist) from the management server 138 in one example. In another example, the teacher can add whitelisted websites, as will be shown in relation to FIG. 8C.

Continuing with FIG. 6B, a third lock type can be a document lock 616. The document lock 616 can restrict the group of student devices to opening documents on a whitelist, or prevent opening of documents that can be on a blacklist. The respective lists can be downloaded or implemented as described with regard to the lists for a web lock 614.

As an example, the document lock 616 can allow a teacher to lock answers to a class exercise until after the exercise is complete. This can ensure that the student will not have access to answers prematurely. Additionally, class lesson plans can include documents or media clips that only become relevant later in the lesson. In this way, the document lock 616 can prevent the student from becoming distracted by prematurely exploring non-relevant materials.

A fourth lock type can be a custom lock profile 618. Lock profiles can be available for selection in an example. The custom lock profile 618 can apply a combination of application locks, web locks, and document locks in one example. This can allow a teacher to quickly apply all the relevant locks for that class. The teacher device 112 or administrative console can be used to customize the lock profile and store it on the management server 138 in one example. Executing the lock profile can involve sending a lock profile identifier to the management server 138 so that it can coordinate all the applicable locks in one example. In another example, the teacher device 112 itself can loop through the applicable locks, sending multiple locking messages to the management server 138.

Based on timing information, a custom lock profile 618 can allow for a series of locks to be applied and unlocked during the course of the class. In a first example of different groups of students alternating at different learning stations in a classroom, a timed custom lock profile can naturally cause the students to rotate stations in a timely fashion based on which assets are unlocked and which station they correspond to. As another example, a group of students can receive staggered access to materials and media during a lesson plan. Then locks can be applied during a quiz towards the end of class, with answers unlocking after the quiz is scheduled to end.

Another custom lock profile can allow for the teacher to lock additional or all student device functionality within the limited-function application as a punishment. For example, a lock preventing texting can remain in place even during lunch period if the management server 138 recognizes the lock profile as a punishment lock profile. Timing information can be set commiserate with the punishment.

Additionally, the teacher device 112 can allow selecting an option 619 to remove the locks prior to the scheduled time for a timed lock. In one example, this occurs as part of dismissing class, which can include detecting that a time threshold has been exceeded. In another example, the teacher can prematurely remove the locks, such as if class is over early or if the locks are no longer needed in the class.

The GUI 600 can present additional indicators not illustrated here. For example, the GUI 600 can indicate battery levels of the student devices in one example. This can allow the teacher to better assess whether to utilize student devices for an upcoming portion of the class, or, if multiple battery levels appear to be low, to instead perform class functions under more traditional means. The GUI can also have a button to cause the teacher device 112 to broadcast or listen to broadcasts of peer-to-peer communications to check current attendance.

In one example, the graphical user interface used by the teacher can be presented in a web browser, with similar functionality available.

Figure 6C:
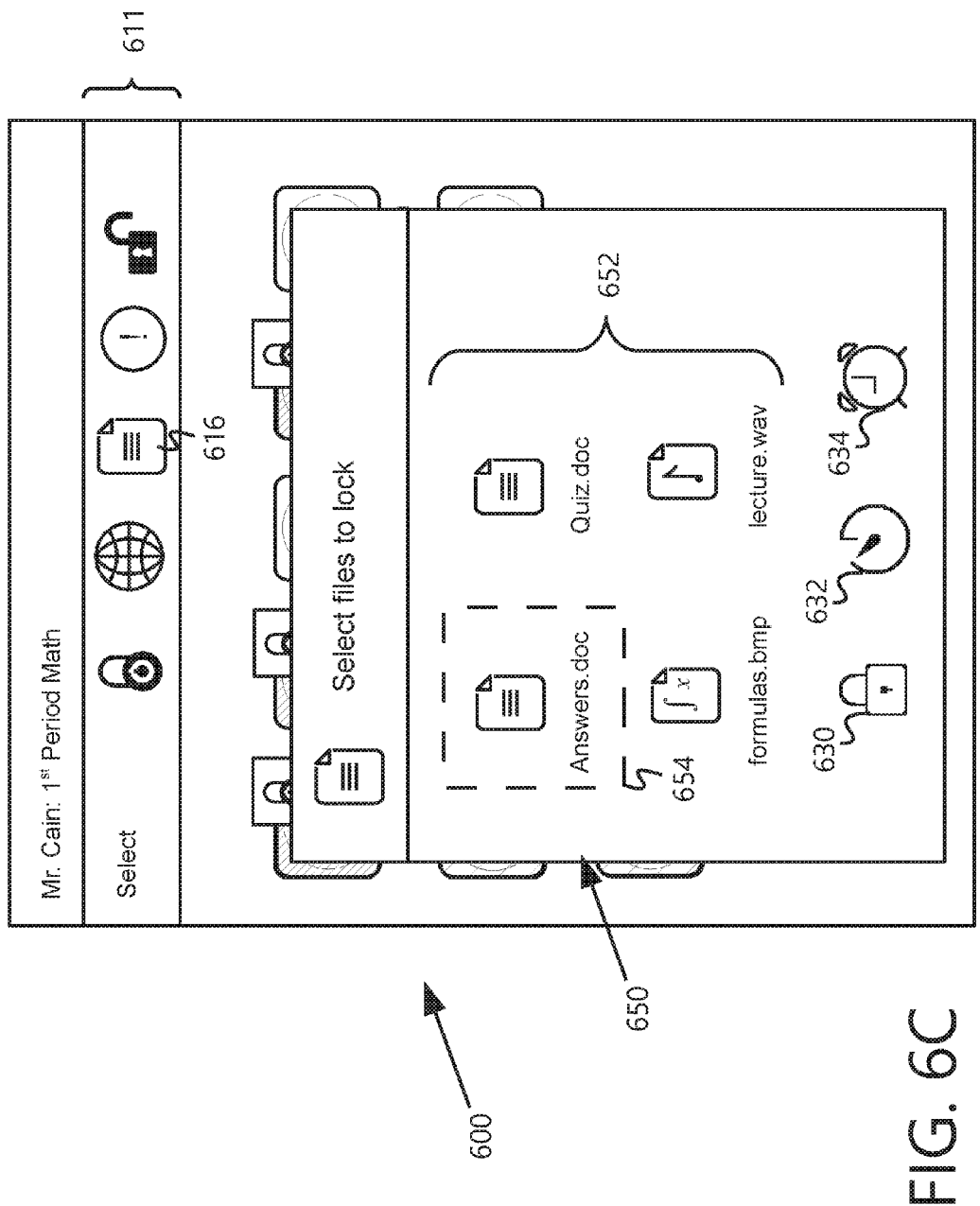

FIG. 6C includes an exemplary illustration of a graphical user interface 600 presenting options for selecting assets to control in connection with a file lock 616. After the teacher selects a group 610 and selects the file lock 616, an asset selection pane 650 can be presented. The asset selection pane 650 can include assets 652 to which the file lock 616 can apply. The managed assets 652 can be defined at the management server 138 with an administrative console, or through file management options at the teacher device 112. The teacher can cause the student devices to check for new managed files to download by using management component procedure calls. These managed files can be added to the asset selection pane 650. In one example, newly-added files default to a locked state. This can allow a teacher to add files without worrying that students will examine the contents before the teacher has a chance to lock them.

In this example, the teacher can select Answers.doc 654 for applying the file lock. This can prevent students from opening Answers.doc 654 for a period of time.

The timing information options in this example include a perpetual lock 630, a time entry lock 632, or a timed lock 634. The perpetual lock 630 will remain locked until some event occurs, such as class is dismissed or the student device leaves the school geographic borders. The time entry lock 632 can allow the teacher to enter at least an end time. In one example, the teacher can enter one or more start and/or end times to turn the lock on and off in conjunction with an anticipated class schedule. The timed lock 634 can allow the teacher to enter an amount of time for the lock to remain in force.

Figure 6D:
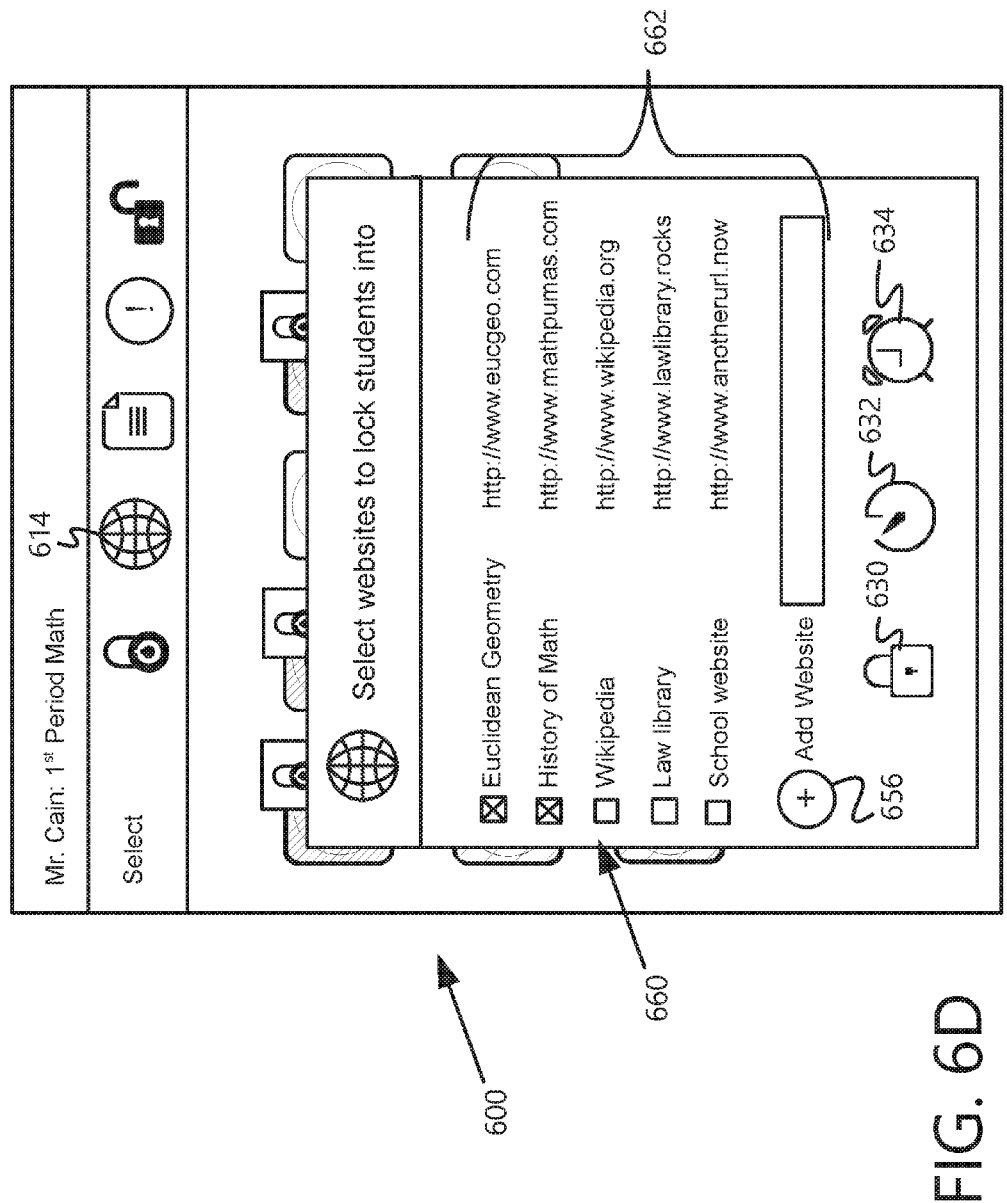

FIG. 6D includes an exemplary illustration of a graphical user interface 600 presenting options for selecting assets to control in connection with a web lock 614. As is shown in web asset pane 660, a list of website assets 662 are presented. A subset can be whitelisted or blacklisted by the teacher device 112. In this example, the teacher has selected to whitelist the Euclidean Geometry and History of Math websites as part of the web lock 614 for group 620. Once the web lock 614 is applied, student devices in group 620 will not be able to access the other listed websites. The web lock 614 can be enforced on the group 620 of student devices by causing the student devices to route all attempted web traffic through the whitelist or blacklist currently in force as part of the web lock.

The web asset pane 660 can also include an option 656 to add another website to the list 662. This can allow the teacher to locate appropriate websites and whitelist those websites before or during class.

Timing information can be applied to the web lock 614 using timing options 630, 632, and 634, as previously described.

Figure 6E:
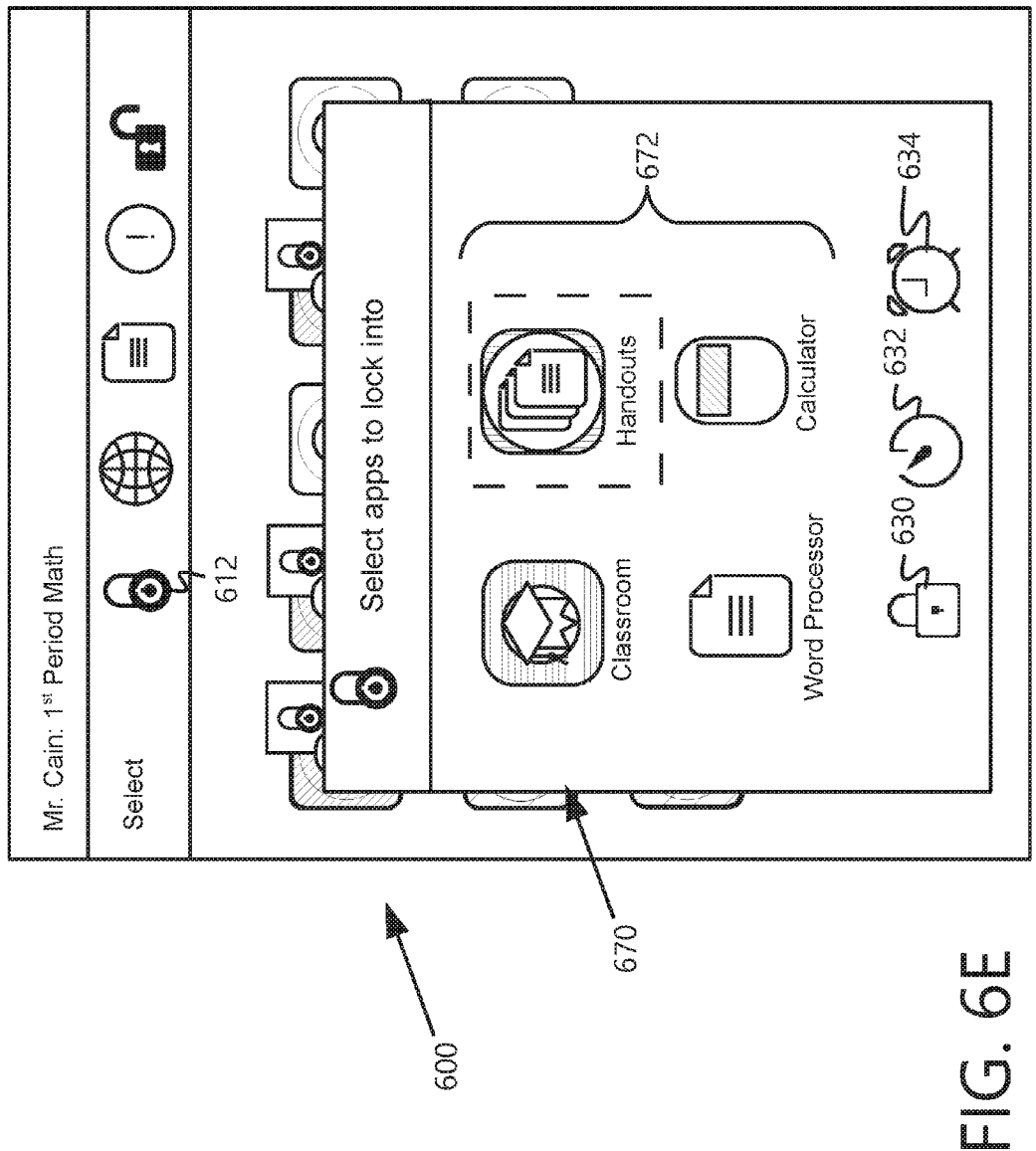

FIG. 6E includes an exemplary illustration of a graphical user interface 600 presenting options for selecting assets to control in connection with an application lock 612. As is shown in pane 670, a list of application assets 672 can be presented. This can include managed applications, a subset of which can be selected by the teacher device 112. The student device can be locked into one or more of the managed applications (or other applications) based on the teacher device 112 selections in an example. In this example, the teacher has selected to lock the group of student devices into the Handouts application. This can cause the management server 138 to interact with a management component (e.g., device level) on each of the selected group of student devices in order to implement the application lock.

Similar timing information can be applied to the application lock 612 using timing options 630, 632, and 634.

Figure 7:
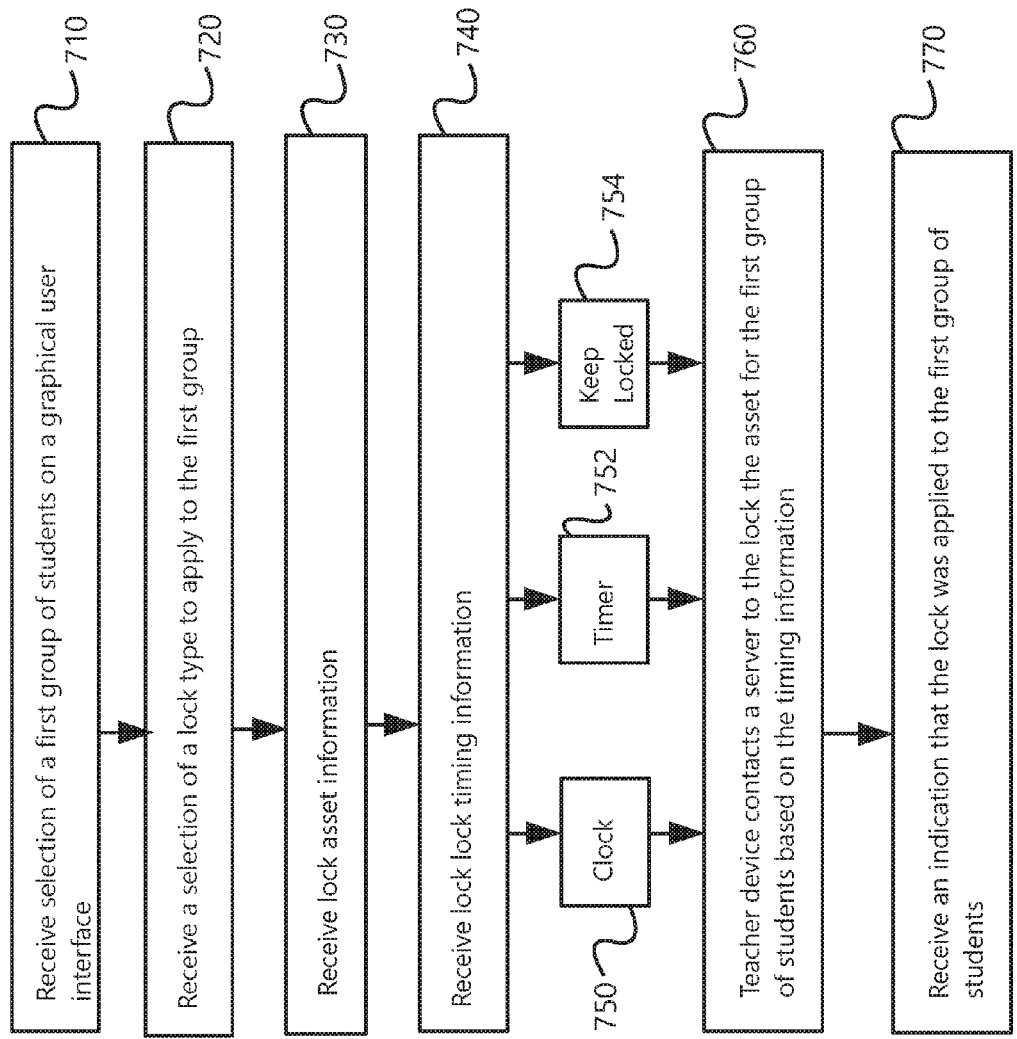
FIG. 7 is an exemplary flow chart of stages performed by a teacher device.
Figure 8:
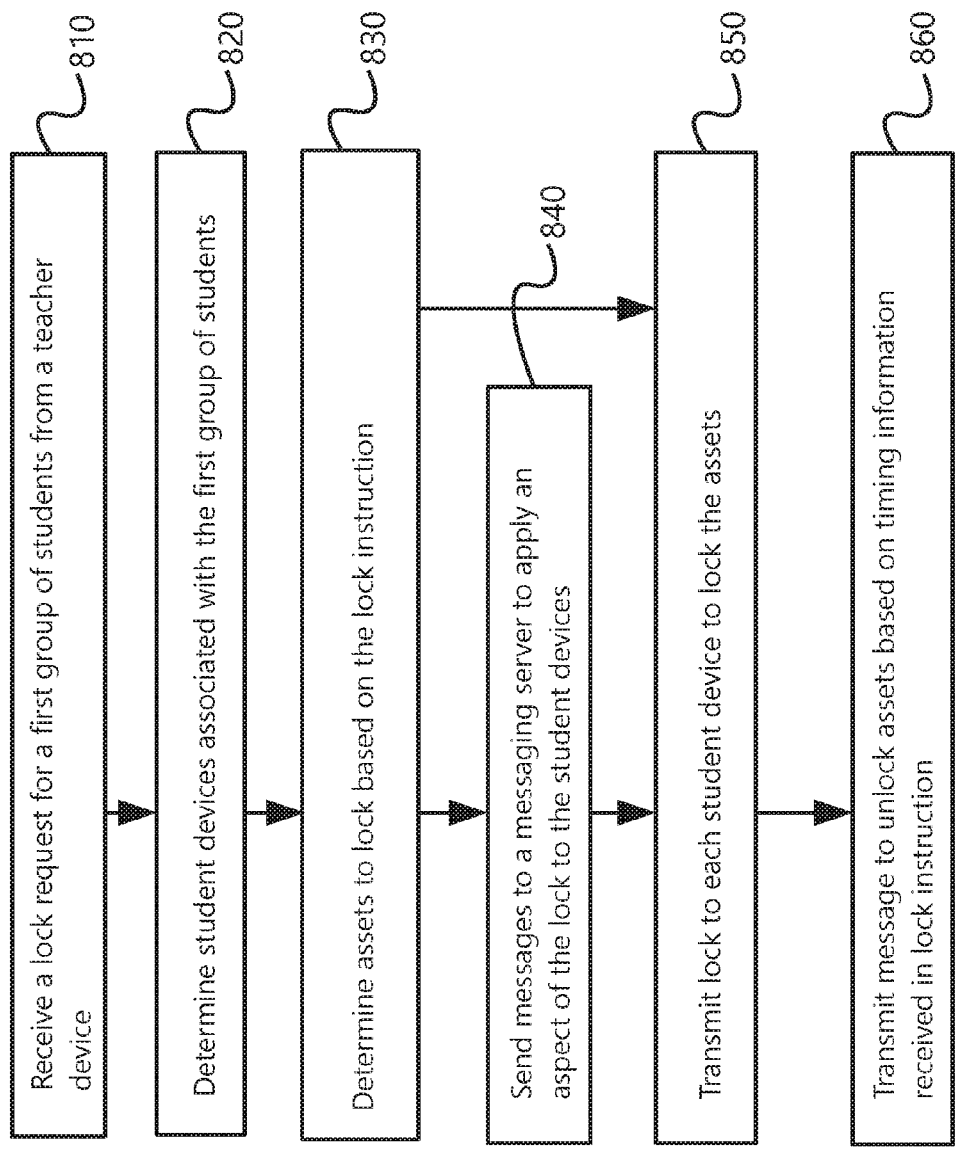
FIG. 8 is an exemplary flow chart of stages performed by a management server.

FIGS. 7 and 8 are additional exemplary flow charts, from the perspectives of the teacher device 112 and the management server, respectively.

Turning to FIG. 7, further exemplary stages that can be performed by a teacher device 112 are illustrated. At stage 710, the teacher device 112 can receive selection of a first group of students on a graphical user interface. This can include manually selecting the students, or can include loading a previously-saved group.

At stage 720, the teacher device receives a selection of a lock type to apply to the group. In one example, the lock type can include an application lock, file lock, web lock, or combination.

At stage 730, the teacher selects one or more assets to which to apply the lock. The teacher can add additional assets to the list in one example, causing the assets to be sent to the student devices.

At stage 740, the teacher device receives timing information. This can include a selection of one or more start or end times at 750, a timer at 752, or an option to keep the asset(s) locked at 754.

At stage 760, the teacher device transmits a lock request to a server. This can include one or more messages that convey the lock type, assets to lock, timing information, and the group of student devices to which the lock applies.

Once the server has facilitated the locks, at stage 770 the teacher device 112 can receive an indication that the lock was applied to the group of students. For example, the graphical user interface can include visual indicators of the types of locks applied to the first group.

FIG. 8 includes exemplary stages that can be performed by a management server in accordance with an example. At stage 810, the management server 138 can receive a lock request for a first group of student devices 122 and 126 from a teacher device 112. This can include a message that includes an array of device identifiers in one example. In another example, the group is saved to the management server such that a group identifier is sent with the lock request, allowing the management server to retrieve the device identifiers associated with the group identifier. In another example, the teacher device 112 loops through the device identifiers, sending separate messages for each device identifier that singularly or collectively comprise a lock request.

At stage 820, the management server 138 can determine the student devices 122 and 126 associated with the first group of students. This can be accomplished by using a database to look up the student devices associated with the device identifiers or group identifier.

At stage 830, the management server 138 can determine the assets to lock. This can be accomplished by using a database to look up the assets associated with the asset identifiers in the lock request.

At stage 840, the management server 138 can engage a messaging server 148 to apply an aspect of a lock, such as to cause each student device to report to the management server to receive a lock instruction.

At stage 850, the management server 138 can send the lock instruction to each student device 122 and 126 in the first group. This can include the timing information in one example.

For student devices 122 and 126 that cannot manage their own locks based on the timing information, the management server 138 can schedule unlock events based on the timing information. Based on these events, at stage 860 the management server 138 can send one or more messages to unlock assets based on the timing information.

Additional functionality can also be included in the system. For example, the system can onload new student devices at an administrative console in one example. For example, a school administrator or automated administrative process can register student devices for particular students and assign students to particular classes. The days and times of each class and the teacher for each class can be stored in a database together with the student and student device information. Moreover, the various features of the examples described herein are not mutually exclusive. Rather, any feature of any example described herein can be incorporated into any other suitable example.

Other examples of the invention will be apparent to those skilled in the art from consideration of the specification and practice of the invention disclosed herein. Additionally, although examples related to teachers and students are discussed herein, an example can be applied to other environments as well, such as corporate environments where employee attendance is tracked and device functionality is managed. In that instance, an employee would be considered a user and a manager can be considered the master. It is intended that the specification and examples be considered as exemplary only, with a true scope and spirit of the invention being indicated by the following claims.

What is claimed is:

1. A system for teacher-controlled launching of resources on student devices, including:
    a teacher device comprising one or more processors and memory;
    a management server that enforces management services on a plurality of student devices and the teacher device, wherein a management component is installed on the teacher device and a student device of the plurality of student devices by the management server; and
    wherein the teacher device executes the one or more processors and memory to execute a teacher application that performs stages including:
    generating a graphical user interface ("GUI") that lists students in a class associated with the teacher device, wherein the GUI of the teacher device includes a selectable lock profile to apply to student devices, wherein the lock profile automatically updates to new configurations based on upcoming lesson plans;
    receiving selections, on the GUI, including:
        a first selection of a student associated with the student device by selecting a student icon on the GUI;
        a second selection of a managed application for use at the student device by selecting from multiple available applications; and
        a third selection of a resource for use with the managed application at the student device, wherein the resource is a file or webpage; and
    sending a message to the management component of the student device, wherein the message includes a whitelist of resources that can be accessed by the student device and causes the management component of the student device to:
    launch the managed application;
    apply a lock that prevents the student device from exiting the managed application, wherein the lock allows use of all the resources in the whitelist while the lock is in place;
    allow access to the resource from within the managed application while the lock is in place; and
    while the lock is in place, restrict the managed application from accessing other resources presented for selection but unselected at the teacher device as for use with the managed application.

2. The system of claim 1, wherein the first selection includes a group of student devices, wherein separate messages are sent from the teacher device to each of the student devices in the group.

3. The system of claim 1, wherein the resources include at least one document that the student device is allowed to access during a duration of the lock.

4. The system of claim 1, wherein the stages further include a fourth selection of a lock type on the graphical user interface, the lock type being selected from a group that includes an application lock, a file lock, and a web lock.

5. The system of claim 1, wherein the management server sets the management component of the plurality of student devices to accept the lock from the teacher device.

6. A method for teacher-controlled launching of resources on student devices, including:
- installing a management component on a teacher device and a student device by a management server;
- installing a teacher application on the teacher device, the teacher application performing stages on the teacher device including:
- generating a graphical user interface (GUI) that displays students in a class associated with the teacher device, wherein the GUI of the teacher device includes a selectable lock profile to apply to student devices, wherein the lock profile automatically updates to new configurations based on upcoming lesson plans;
- receiving selections, on the GUI graphical user interface, including:
    - a first selection of a student associated with the student device by selecting a student icon on the GUI;
    - a second selection of a managed application for use at the student device by selecting from multiple available applications; and
    - a third selection of a resource for use with the managed application at the student device, wherein the resource is a file or webpage of a student associated with the student device and a resource for use at the student device; and
- sending a message to the management component of the student device, wherein the message includes a whitelist of resources that can be accessed by the student device and causes the management component of the student device to:
    - run the managed application;
    - apply a lock that prevents the student device from exiting the managed application, wherein the lock allows use of all the resources in the whitelist while the lock is in place;
    - allow access to the resource from within the managed application while the lock is in place; and
    - while the lock is in place, restrict the managed application from accessing other resources presented for selection but unselected at the teacher device as for use with the managed application.

7. The method of claim 6, wherein the first selection implicates a plurality of student devices and separate messages are sent from the teacher device to each of the plurality of student devices.

8. The method of claim 6, wherein the resources include at least one document that the student device is allowed to access during a duration of the lock.

9. The method of claim 6, wherein the stages further include a fourth selection of a lock type on the graphical user interface, the lock type being selected from a group that includes an application lock, a file lock, and a web lock.

10. The method of claim 6, wherein the management server sets the management component of a plurality of student devices to accept the lock from the teacher device.

11. A non-transitory, computer-readable medium including instructions that cause a processor to perform stages comprising:
- installing a management component at a student device, the management component including an application programming interface for controlling functionality at the student device;
- generating, on a teacher device, a graphical user interface ("GUI") that displays students in a class associated with the teacher device, wherein the GUI of the teacher device includes a selectable lock profile to apply to student devices, wherein the lock profile automatically updates to new configurations based on upcoming lesson plans;
- receiving selections on the GUI including:
    - a first selection of a student associated with the student device by selecting a student icon on the GUI;
    - a second selection of a managed application for use at the student device by selecting from multiple available applications; and
    - a third selection of a resource for use with the managed application at the student device, wherein the resource is a file or webpage of a student associated with the student device; and
- sending a message to the management component of the student device, wherein the message includes a whitelist of resources that can be accessed by the student device and causes the management component of the student device to:
    - launch the managed application;
    - apply a lock that prevents the student device from launching at least one other application;
    - allow access to the resource from within the managed application while the lock is in place; and
    - while the lock is in place, restrict the managed application from accessing other resources that are presented for selection but unselected at the teacher device as for use with the managed application.

12. The non-transitory, computer-readable medium of claim 11, wherein the resources include at least one additional managed application that the student device is allowed to access during a duration of the lock.

13. The non-transitory, computer-readable medium of claim 12, wherein the resources include at least one additional webpage that the student device is allowed to access from within the managed application during a duration of the lock.

14. The method of claim 6, wherein the management component is part of an operating system of the student device, separate from the managed application.

15. The system of claim 1, wherein the management component is part of an operating system of the student device, separate from the managed application.

* * * * *